United States Patent
Tahara et al.

(10) Patent No.: US 9,215,126 B2
(45) Date of Patent: Dec. 15, 2015

(54) INFORMATION PROCESSING SYSTEM RUNNING OPERATING SYSTEMS BASED ON CONNECTION STATE

(71) Applicant: Panasonic Intellectual Property Management Co., Ltd., Osaka-shi, Osaka (JP)

(72) Inventors: Yasutaka Tahara, Osaka (JP); Dai Fujikawa, Osaka (JP); Hirofumi Asakura, Osaka (JP); Hikaru Fujiwara, Osaka (JP); Shinji Goto, Hokkaido (JP); Takehiro Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 393 days.

(21) Appl. No.: 13/689,762

(22) Filed: Nov. 30, 2012

(65) Prior Publication Data

US 2013/0144930 A1    Jun. 6, 2013

(30) Foreign Application Priority Data

Dec. 5, 2011    (JP) ................................ 2011-266245

(51) Int. Cl.
    G06F 15/16    (2006.01)
    H04L 29/08    (2006.01)
    G06F 9/44    (2006.01)
    G06F 9/54    (2006.01)

(52) U.S. Cl.
    CPC ........ H04L 29/08072 (2013.01); G06F 9/4418 (2013.01); G06F 9/541 (2013.01)

(58) Field of Classification Search
    CPC ............................... G06F 9/4418; G06F 9/445

USPC .............................................. 709/201; 718/1
See application file for complete search history.

(56) References Cited

U.S. PATENT DOCUMENTS

| | | | | |
|---|---|---|---|---|
| 6,028,585 | A * | 2/2000 | Ishii et al. | 345/581 |
| 6,633,759 | B1 | 10/2003 | Kobayashi | |
| 8,090,938 | B2 * | 1/2012 | Xu | 713/100 |
| 8,332,771 | B2 | 12/2012 | Inaba | |

(Continued)

FOREIGN PATENT DOCUMENTS

| | | |
|---|---|---|
| JP | 2001-103568 A | 4/2001 |
| JP | 2001-184149 A | 7/2001 |

(Continued)

OTHER PUBLICATIONS

Office Action for related Japanese Patent Application No. 2011-290255, dated Jan. 28, 2014.

(Continued)

*Primary Examiner* — Shirley Zhang
(74) *Attorney, Agent, or Firm* — Shinjyu Global IP

(57) ABSTRACT

This information processing system processes information through communication between a first information processing device and a second information processing device. The second information processing device has a recording unit and a control unit. The recording unit records a first OS and a second OS. The control unit selects one of the first OS and the second OS, according to a connection state with the first information processing device. The control unit controls the second information processing device or a combination of the first information processing device and the second information processing device, using the OS selected here.

20 Claims, 7 Drawing Sheets

(56) References Cited

U.S. PATENT DOCUMENTS

| | | | |
|---|---|---|---|
| 8,462,103 B1 | 6/2013 | Moscovitch et al. | |
| 8,711,091 B2 | 4/2014 | Nomura et al. | |
| 8,868,901 B2* | 10/2014 | Kim et al. | 713/100 |
| 8,890,805 B2* | 11/2014 | Kwon et al. | 345/156 |
| 8,924,970 B2* | 12/2014 | Newell | 718/1 |
| 8,925,103 B2* | 12/2014 | Kim et al. | 726/27 |
| 8,959,535 B2* | 2/2015 | Teng et al. | 719/323 |
| 2001/0018329 A1 | 8/2001 | Tada et al. | |
| 2003/0210208 A1* | 11/2003 | Pu et al. | 345/1.1 |
| 2009/0037909 A1* | 2/2009 | Xu | 718/1 |
| 2010/0064228 A1* | 3/2010 | Tsern | 715/740 |
| 2010/0281363 A1 | 11/2010 | Inaba | |
| 2010/0309113 A1* | 12/2010 | Trantow | 345/156 |
| 2011/0270991 A1* | 11/2011 | Zawacki et al. | 709/227 |
| 2011/0320405 A1* | 12/2011 | Hsu et al. | 707/634 |
| 2012/0081383 A1* | 4/2012 | Reeves et al. | 345/582 |
| 2012/0136917 A1* | 5/2012 | Abramson et al. | 709/203 |
| 2012/0138685 A1* | 6/2012 | Qu et al. | 235/462.15 |
| 2012/0154265 A1* | 6/2012 | Kim et al. | 345/156 |
| 2012/0266018 A1* | 10/2012 | Tanaka | 714/19 |
| 2012/0299847 A1* | 11/2012 | Kwon et al. | 345/173 |
| 2013/0143522 A1* | 6/2013 | Rege et al. | 455/405 |
| 2013/0169510 A1* | 7/2013 | Tahara et al. | 345/1.3 |
| 2013/0244784 A1* | 9/2013 | Assa | 463/40 |
| 2013/0275973 A1* | 10/2013 | Greenfield et al. | 718/1 |
| 2013/0283193 A1* | 10/2013 | Griffin | 715/761 |
| 2013/0288656 A1* | 10/2013 | Schultz et al. | 455/418 |
| 2013/0290882 A1* | 10/2013 | Cotte | 715/764 |
| 2013/0322335 A1* | 12/2013 | Smith | 370/328 |
| 2013/0334376 A1 | 12/2013 | Moscovitch | |
| 2014/0075377 A1* | 3/2014 | Kang et al. | 715/788 |

FOREIGN PATENT DOCUMENTS

| | | |
|---|---|---|
| JP | 2002-533777 A | 10/2002 |
| JP | 2004-164288 A | 6/2004 |
| JP | 2010-028479 A | 2/2010 |
| JP | 2010-160650 A | 7/2010 |
| JP | 2010-262330 A | 11/2010 |
| JP | 2011-013935 A | 1/2011 |
| JP | 2011-065518 A | 3/2011 |
| WO | WO-00/39493 A1 | 7/2000 |

OTHER PUBLICATIONS

The Notice of Allowance from the corresponding Japanese Patent Application No. 2011-266245 issued on Mar. 18, 2014.

The Office Action from the co-pending U.S. Appl. No. 13/710,288 issued on Jun. 17, 2014.

Office Action for the corresponding Japanese Patent Application No. 2011-266245, dated Jan. 7, 2014.

* cited by examiner

INFORMATION PROCESSING SYSTEM RUNNING OPERATING SYSTEMS BASED ON CONNECTION STATE

CROSS-REFERENCE TO RELATED APPLICATIONS

This application claims priority under 35 U.S.C. §119 to Japanese Patent Application No. 2011-266245 filed on Dec. 5, 2011. The entire disclosure of Japanese Patent Application No. 2011-266245 is hereby incorporated herein by reference.

BACKGROUND

1. Field of the Invention

The present technology relates to information processing systems, and more particularly to information processing systems in which information is processed through communication between a first information processing device and a second information processing device.

2. Description of the Related Art

Various information processing systems in which information is processed between a plurality of terminals have been proposed. A typical example is a system in which information is processed between a server and a client (see JP 2011-013935A). For example, when a client transmits a request command to a server in this case, the server performs data processing relating to registered data, according to the request command from the client, and transmits response data to the client.

With conventional processing of information between a server and a client, information is processed in each terminal (server/client). Based on this idea, processing of information in each terminal can similarly be performed between personal computers or between a mobile terminal and a personal computer, instead of a server and a client. However, with this type of information processing configuration, there is a possibility of not being able to process information effectively, in the case where there is a difference in platform or a difference in platform performance between one terminal and the other terminal. In view of this, construction of a system in which information can be processed effectively, even if there is a difference in platform or a difference in platform performance between one terminal and the other terminal, is desired.

The present technology was made in view of such problems, and it is an object of the present technology to provide a system in which information can be effectively processed in a plurality of terminals, regardless of a difference in platform or a difference in platform performance.

SUMMARY OF THE INVENTION

The information processing system disclosed herein comprises a first information processing device and a second information processing device. The second information processing device includes a recording unit and a control unit. The recording unit includes a first Operating System (OS) and a second OS. The control unit is configured to select one of the first OS and the second OS according to a connection state with the first information processing device. The control unit is configured to control the second information processing device or a combination of the first information processing device and the second information processing device using the selected OS.

Constructing an information processing system in this way enables information to be effectively processed in a plurality of terminals, regardless of a difference in platform.

According to the present technology, information can be processed effectively in a plurality of terminals, regardless of a difference in platform or a difference in platform performance.

DETAILED DESCRIPTION OF THE INVENTION

Selected embodiments will now be explained with reference to the drawings. It will be apparent to those skilled in the art from this disclosure that the following descriptions of the embodiments are provided for illustration only and not for the purpose of limiting the technology as defined by the appended claims and their equivalents.

Description of Devices Constituting an Information Processing System

Figure 1:
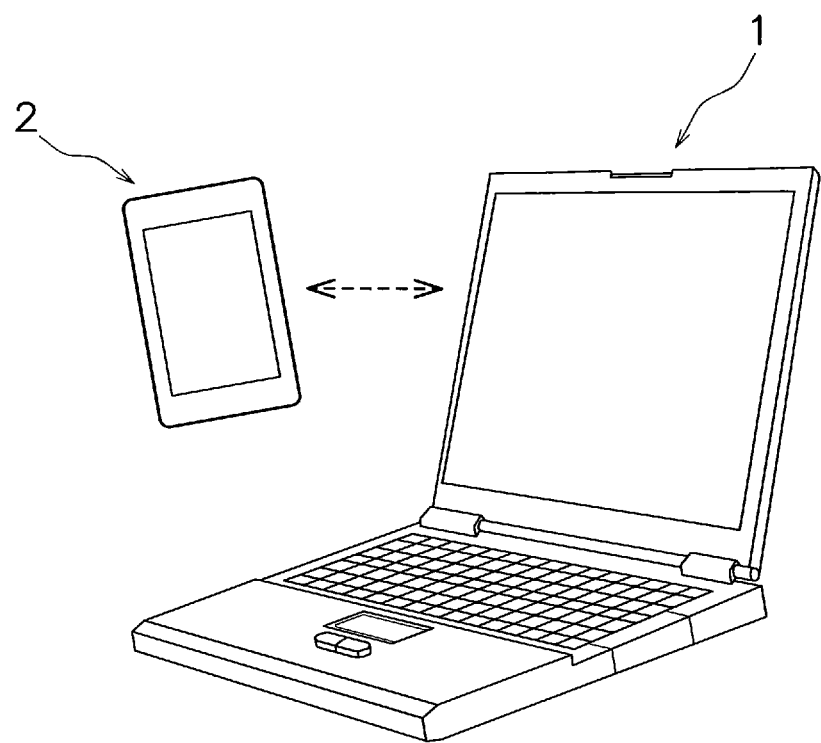
FIG. 1 is a schematic diagram showing a relationship between a mobile device and a personal computer according to one embodiment.

An information processing system is a system in which information is processed through a plurality of devices communicating with each other. For example, as shown in FIG. 1, an information processing system is constituted by a personal computer 1 (exemplary first information processing device; hereinafter referred to as a PC), and a mobile device 2 (exemplary second information processing device).

Note that the word "communication" as used here denotes the "mutual transmission of information between a plurality of devices". That is, the word "communication" encompasses the case where devices communicate contactlessly and the case where devices communicate through direct contact. For example, the case where devices communicate contactlessly encompasses wireless communication, and the like. The case where devices communicate through direct contact encompasses wired communication, communication via a connection end terminal, and the like.

Configuration of a Mobile Device

Figure 2:
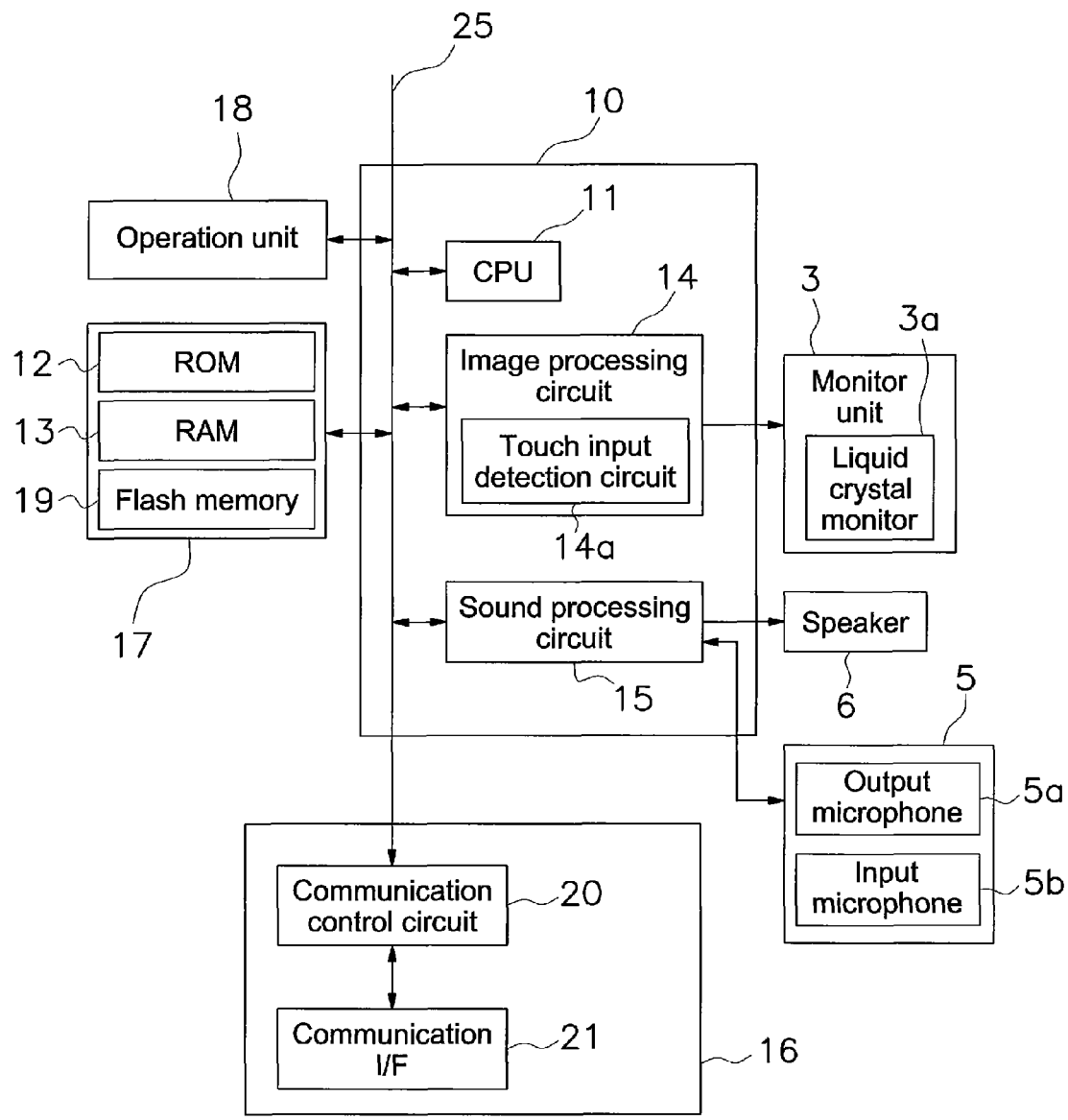
FIG. 2 is a diagram showing a hardware configuration of the mobile device according to one embodiment.

As shown in FIG. 2, the mobile device 2 mainly has a control unit 10, a monitor unit 3, a communication unit 16 (exemplary second communication unit), a storage unit 17 (exemplary recording unit of second information processing device), and an operation unit 18. The control unit 10 has a CPU 11 (Central Processing Unit) that utilizes a microprocessor, an image processing circuit 14, and a sound processing circuit 15. These constituent elements are respectively connected via a bus 25.

The CPU 11 interprets and executes commands from programs. Also, the CPU 11 interprets input/output commands, and executes input and output of data. Furthermore, the CPU 11 executes writing and reading of various data with respect to the storage unit 17.

The image processing circuit 14 controls the monitor unit 3 according to draw instructions from the CPU 11 to display a prescribed image on a liquid crystal monitor 3a. Also, the image processing circuit 14 includes a touch input detection circuit 14a. When instruction means such as a finger, for example, contacts a touch panel, a contact signal is supplied from the touch input detection circuit 14a to the CPU 11, and the contact position on the liquid crystal monitor 3a is recognized by the CPU 11. For example, when the touch panel is contacted by instruction means at the position of an object displayed on a liquid crystal panel, an object selection signal is supplied from the touch input detection circuit 14a to the CPU 11, and the object is recognized by the CPU 11.

The sound processing circuit 15 generates an analog audio signal that depends on a sound command from the CPU 11, and outputs the analog audio signal to a microphone 5a for outputting sound and/or a speaker 6. The volume of the microphone 5a for outputting sound and/or the speaker 6 are adjusted using a volume button of the operation unit 18. Also, the sound processing circuit 15 converts the analog audio signal into a digital audio signal, when sound is input from a microphone 5b for inputting sound.

The communication unit 16 has communication functions for data communication, for communication as a telephone, and the like. The communication function for data communication includes a local wireless network function, an Internet connection function utilizing wireless LAN, and the like.

The communication unit 16 has a communication control circuit 20 and a communication interface 21. The communication control circuit 20 and the communication interface 21 are connected to the CPU 11 via the bus 25. The communication control circuit 20 and the communication interface 21 control a connection signal for connecting the mobile device 2 to the Internet via a local wireless network or a wireless LAN, according to a command from the CPU 11. Also, the communication control circuit 20 and the communication interface 21 control a connection signal for connecting the mobile device 2 to other devices via Bluetooth (registered trademark) or the like, according to a command from the CPU 11.

Also, the communication control circuit 20 and the communication interface 21 receive and control connection signals from other devices. Furthermore, when communicating by telephone, the communication control circuit 20 and the communication interface 21 control a connection signal for connecting the mobile device 2 to a telephone line, according to a command from the CPU 11.

The storage unit 17 is built into the main unit, and is connected to the bus 25. For example, the storage unit 17 includes a ROM 12 (Read Only Memory), a RAM 13 (Random Access Memory), and a flash memory 19. The ROM 12 records programs required for basic control (e.g., startup control, etc.) of the mobile device 2, and the like. The ROM 12 has recorded thereon programs relating to data processing, file control, basic control, and the like.

The RAM 13 functions as a work memory of the control unit 10. The RAM 13 is realized by an SDRAM or the like. The RAM 13 also functions as an internal memory for recording various data, image information, audio information, and the like. The flash memory 19 is a rewritable nonvolatile memory. Basic programs, various data, and programs for hardware control are recorded in the flash memory 19. Also, an OS (Operating System) is installed in the flash memory 19. Note that the flash memory 19 may also be integrated into the RAM 13.

The operation unit 18 has a home button, a volume button and the like which are not shown. When the home button is pressed, a home screen of the mobile device 2 is displayed, the mobile device 2 is restored from a sleep state, or the like. When the volume button is pressed, the volume is increased or decreased.

Note that interface circuits mediate between the bus 25 and each constituent element if needed. Here illustration of the interface circuits is omitted.

Configuration of a PC 1

Figure 3:
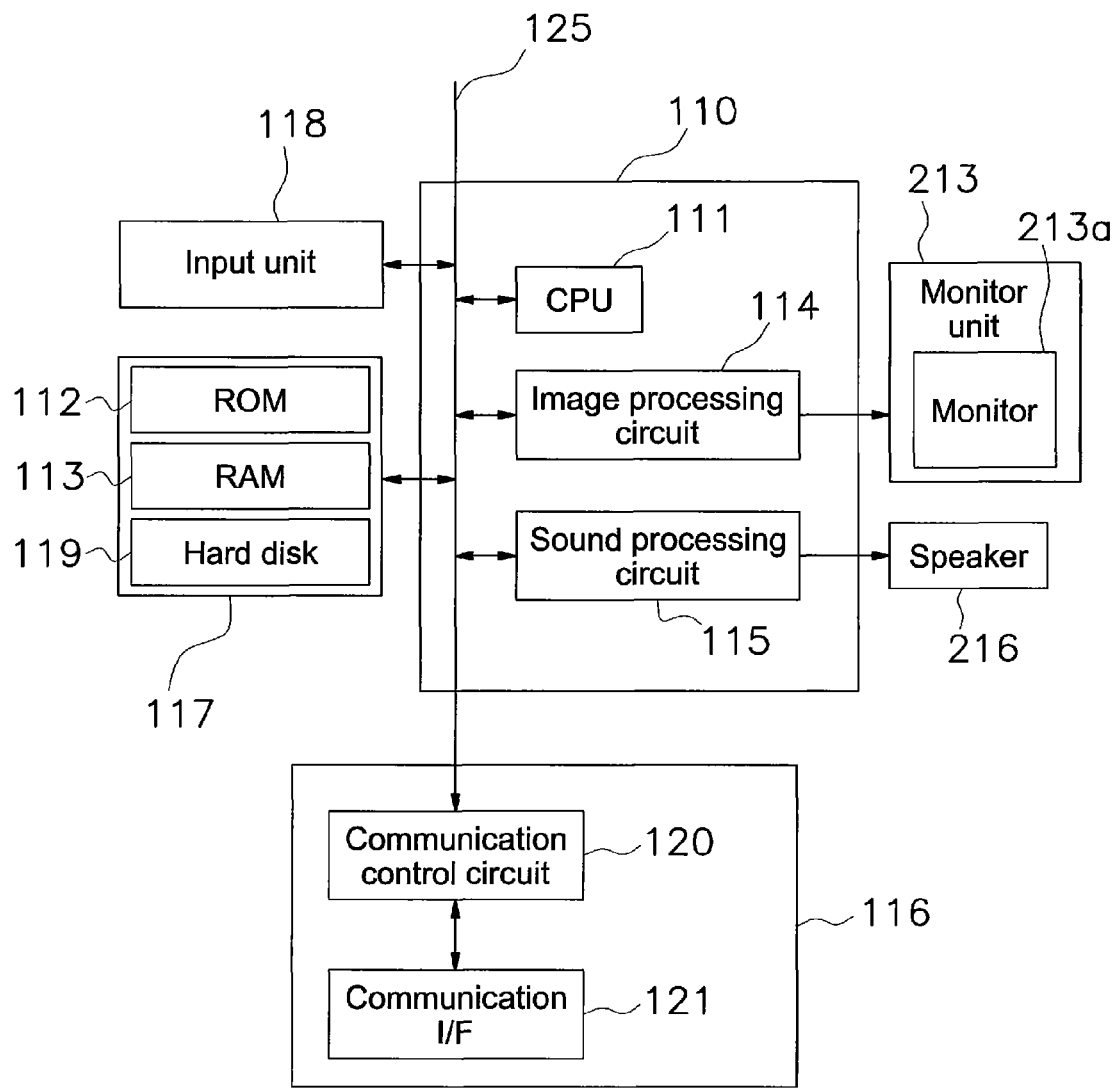
FIG. 3 is a diagram showing a hardware configuration of the personal computer according to one embodiment.

As shown in FIG. 3, the PC 1 mainly has a control unit 110, a monitor unit 213 (exemplary display unit), a communication unit 116 (exemplary first communication unit), a storage unit 117 (exemplary recording unit of first information processing device), and an input unit 118. The functions of the constituent elements 110, 116 and 117 shown here are basically similar to the mobile device 2. Thus, hereinafter, functions that are similar to the mobile device 2 will be described briefly, and functions that are the different from the mobile device 2 will be described in detail. Functions that are omitted here are intended to be equivalent to functions of the mobile device 2.

The control unit 110 has a CPU 111, an image processing circuit 114, and a sound processing circuit 115. These constituent elements are respectively connected via a bus 125. The CPU 111 interprets various commands and executes various processing. The image processing circuit 114 controls the monitor unit 213 according to draw instructions from the CPU 111 to display a prescribed image on a monitor 213a. Note that, in the present embodiment, the monitor 213a may be a touch panel or may be a non-touch panel. The sound processing circuit 115 generates an analog audio signal that depends on a sound instruction from the CPU 111, and outputs the generated signal to the speaker 216. Note that, in the present embodiment, it is assumed that the throughput of the CPU 111 of the PC 1 is lower than the CPU 11 of the mobile device 2.

The communication unit 116 has communication functions for data communication and the like. The communication function for data communication includes a local wireless network function, an Internet connection function utilizing wireless LAN, and the like. Also, the communication function for data communication includes the function utilizing Bluetooth (registered trademark) and the like. The communication unit 116 has a communication control circuit 120 and a communication interface 121.

The storage unit 117 is built into the main unit, and is connected to the bus 125. For example, the storage unit 117 has a ROM 112, a RAM 113, and a hard disk 119. The ROM 112 records programs relating to basic control of the PC 1, and the like. The RAM 113 functions as a work memory of the control unit 110. The hard disk 119 is a magnetic disk, for example. Basic programs, various data, and programs for hardware control are recorded in the hard disk 119. Also, an OS is installed in the hard disk 119.

The input unit 118 is a device that is capable of inputting information. The input unit 118 is a keyboard and/or a mouse, for example. A user gives a desired command to the control unit 110 by operating the input unit 118.

Note that interface circuits mediate between the bus 125 and each constituent element if needed. Here illustration of the interface circuits is omitted.

Functions and Operations of the Information Processing System

Next, the specific contents of this information processing system will be described. A flowchart shown in FIG. 6 will also be described at the same time. This information processing system is, as shown in FIG. 1, a system in which information is processed through communication between the PC 1 and the mobile device 2. In this information processing system, a first OS and a second OS are recorded in the flash memory 19 of the mobile device 2 (see FIG. 5). The first OS is an OS for a PC and the second OS is an OS for a mobile device.

Also, application programs (host software) for launching on the first OS, virtual software, and control software are installed in the flash memory 19 of the mobile device 2. Furthermore, application programs (guest software) for launching on the second OS and control software are installed in the flash memory 19 of the mobile device 2.

First, in a state where the PC 1 and the mobile device 2 have been started up, the PC 1 is controlled by a OS for a PC (third OS that is not shown), control software and the like (S1). Note that although the third OS is a OS for a PC, an advanced OS need not to be used as long as the PC 1 can be controlled. Also, control software need not to necessarily be an OS, and may be any software capable of controlling the PC 1. Hereinafter, description is given using an example in the case where the third OS controls the PC 1.

Figure 4:
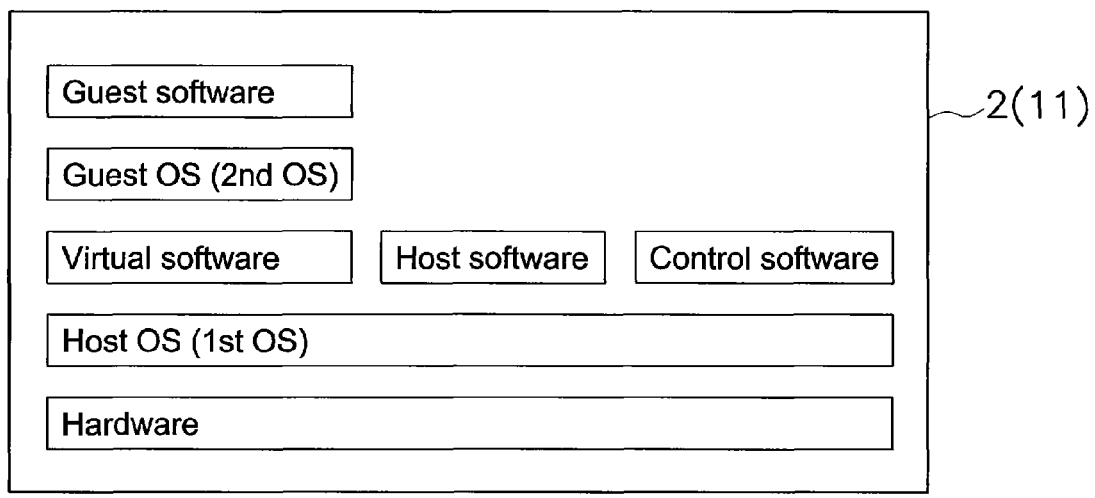
FIG. 4 is a diagram showing a software configuration in the mobile device according to one embodiment.

On the other hand, the mobile device 2 is controlled by the second OS. As shown in FIG. 4, the CPU 11 of the mobile device 2 runs the first OS as a host OS and runs the second OS as a guest OS (S100). To be specific, the CPU 11 of the mobile device 2 executes virtual software on the first OS (host OS), and runs the second OS (guest OS) on the virtual software.

In this state, the CPU 11 of the mobile device 2 runs the second OS in the foreground. The CPU 11 of the mobile device 2 is capable of executing control software for controlling hardware, on the first OS. Hardware is, for example, the hardware of the mobile device 2 and the hardware of the PC 1. Also, the CPU 11 of the mobile device 2 is capable of executing host software, on the first OS. Furthermore, the CPU 11 of the mobile device 2 is capable of executing guest software, on the second OS.

The CPU 11 of the mobile device 2 constantly monitors the communication state with the PC 1, in the state where the second OS is running in the foreground. Specifically, the CPU 11 of the mobile device 2 monitors the communication state between the communication unit 16 of the mobile device 2 and the communication unit 116 of the PC 1. The CPU 11 of the mobile device 2 then judges whether communication is possible between the communication unit 16 of the mobile device 2 and the communication unit 116 of the PC 1 (S101). Here, in the case where communication is not possible between the communication unit 16 of the mobile device 2 and the communication unit 116 of the PC 1 (No at S101), the CPU 111 of the PC 1 controls the third OS (S1) and the CPU 11 of the mobile device 2 controls the second OS (S100), as mentioned above. Also, in this case, the CPU 11 of the mobile device 2 can execute guest software, on the second OS, as mentioned above.

On the other hand, in the case where communication is possible between the communication unit 16 of the mobile device 2 and the communication unit 116 of the PC 1 (Yes at S101), the CPU 11 of the mobile device 2 runs the first OS in the foreground, instead of the second OS (S102). The CPU 11 of the mobile device 2 then recognizes the PC 1, using the first OS. Then, the CPU 11 of the mobile device 2 issues a command for suspending or hibernating the third OS to the PC 1 (S103). Then, the CPU 111 of the PC 1 suspends or hibernates the third OS (S2). Thereafter, the CPU 11 of the mobile device 2 starts control of the PC 1, using the first OS (S104).

Note that an example was given here in the case where the CPU 11 of the mobile device 2 suspends or hibernates the third OS. Alternatively, in the case where communication is possible between the communication unit 16 of the mobile device 2 and the communication unit 116 of the PC 1, the CPU 111 of the PC 1 may suspend or hibernate the third OS after recognizing the presence of the mobile device 2.

In this state, the CPU 11 of the mobile device 2 controls both the mobile device 2 and the PC 1, using the first OS. Specifically, the CPU 11 of the mobile device 2, under the control of the first OS, recognizes and controls the hardware 3, 5, 6, 10, 16, 17 and 18 of the mobile device 2 and the hardware 110, 116, 117, 118, 213 and 216 of the PC 1.

The first OS is controlled by the CPU 11 of the mobile device 2 (see FIG. 4). In other words, the CPU that controls the mobile device 2 and the PC 1 is the CPU 11 of the mobile device 2. Thus, commands issued by the hardware 110, 116, 117, 118, 213 and 216 of the PC 1 are interpreted by the CPU 11 of the mobile device 2. Also, commands received by the hardware 110, 116, 117, 118, 213 and 216 of the PC 1 are issued by the CPU 11 of the mobile device 2. In this way, even if the capability of the CPU 111 of the PC 1 is inferior to the CPU 11 of the mobile device 2, information can be effectively processed by the CPU 11 of the mobile device 2 controlling the hardware 110, 116, 117, 118, 213 and 216 of the PC 1.

Figure 5:
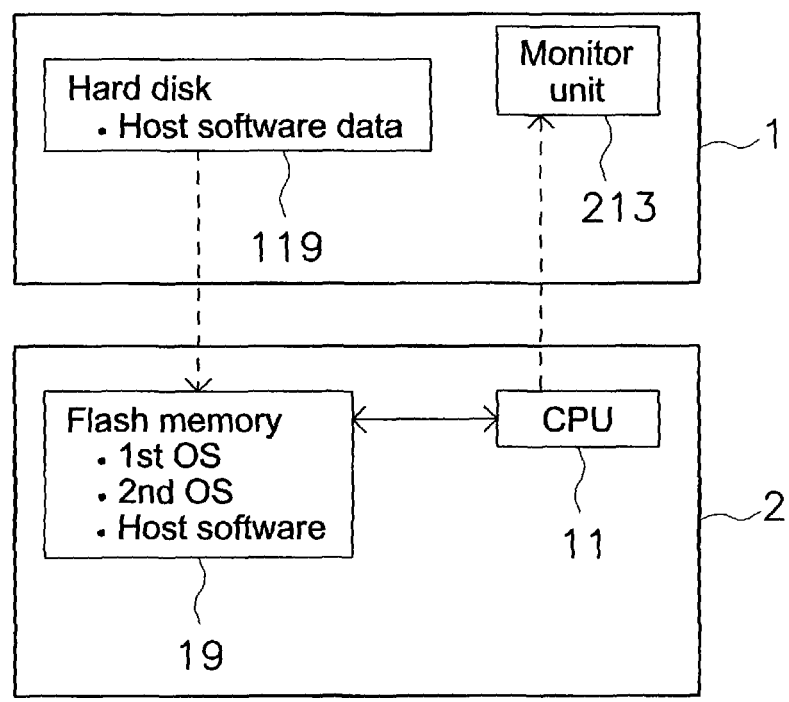
FIG. 5 is a diagram showing one configuration in which the mobile device according to one embodiment controls the personal computer.
Figure 6:
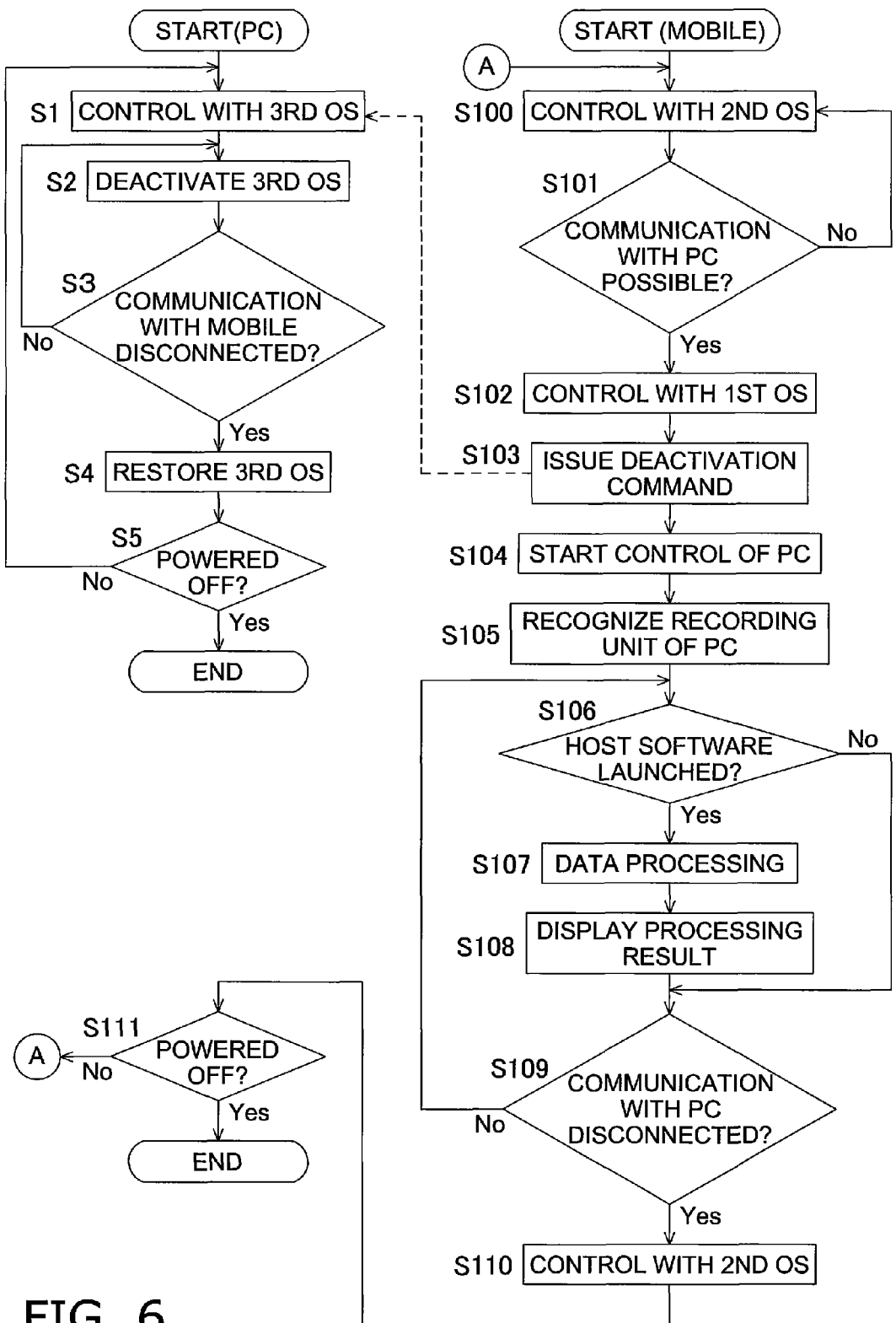
FIG. 6 is a flowchart showing processing in an information processing system according to one embodiment.

Next, the CPU 11 of the mobile device 2 recognizes the storage unit 117 of the PC 1, using the first OS (S105). In the case where data corresponding to host software is recorded in the hard disk 119 of the PC 1, as shown in FIG. 5, for example, the CPU 11 of the mobile device 2 is thereby able to refer to the hard disk 119 of the PC 1 and recognize data corresponding to host software. Also, this data corresponding to host software can be processed using the host software, by copying the data to the flash memory 19. In this way, providing a recording area that is accessible by the first OS enables data corresponding to host software to be appropriately processed by the CPU 11 of the mobile device 2.

Note that although an example was given here in the case where data corresponding to host software is recorded in the hard disk 119, data corresponding to host software can also be processed using the host software in the case where this data is recorded in another recording unit, by copying the data corresponding to the host software to the flash memory 19.

As mentioned above, the CPU 11 of the mobile device 2 controls hardware and various data in the mobile device 2 and the PC 1. For example, in the case where a user launches host software such as word processing software (Yes at S106), a screen for the word processing software is displayed on the monitor unit 213 of the PC 1. In the case where the user performs an input to the input unit 118 of the PC 1 in this state, processing corresponding to the input is performed by the CPU 11 of the mobile device 2, based on the word processing software (S107). The processing result is transmitted from the mobile device 2 to the PC 1, and displayed on the screen for the word processing software on the monitor unit 213 of the PC 1 (see S108 and FIG. 5). Here, in the case where host software is not launched (No at S106), step 109 (S109) which will be discussed later is executed.

As mentioned above, the CPU 11 of the mobile device 2 constantly monitors the communication state between the communication unit 16 of the mobile device 2 and the communication unit 116 of the PC 1. Thus, in the case where communication between the communication unit 16 of the mobile device 2 and the communication unit 116 of the PC 1 is disconnected (Yes at S109), the CPU 11 of the mobile device 2 runs the second OS in the foreground, instead of the first OS (S110). Note that an example was given here in the case where the CPU 11 of the mobile device 2 monitors the communication state between the mobile device 2 and the PC 1. A controller (not shown) incorporated into the communication unit 16 of the mobile device 2, such as into the communication control circuit 20, for example, may monitor the communication state between the mobile device 2 and the PC 1.

Also, a controller (not shown) incorporated into the communication unit 116 of the PC 1, such as into the communication control circuit 120, for example, constantly monitors the communication state between the mobile device 2 and the PC 1. Thus, in the case where communication between the communication unit 16 of the mobile device 2 and the communication unit 116 of the PC 1 is disconnected (Yes at S3), the controller of the communication unit 116 of the PC 1 wakes up the PC 1, and restores the third OS (S4). The hardware 110, 116, 117, 118, 213 and 216 of the PC 1 is thereby controlled, under the control of the third OS. Note that in the case where communication between the communication unit 16 of the mobile device 2 and the communication unit 116 of the PC 1 is maintained (No at S3), the PC 1 is controlled by the second OS, in the state where the third OS of the PC 1 is inactive (S2).

On the other hand, in the case where communication between the communication unit 16 of the mobile device 2 and the communication unit 116 of the PC 1 is maintained (No at S109), the CPU 11 of the mobile device 2 continues to control the hardware 3, 5, 6, 10, 16, 17 and 18 of the mobile device 2 and the hardware 110, 116, 117, 118, 213 and 216 of the PC 1, under the control of the first OS (S106).

Finally, in the case where the PC 1 has been powered off (Yes at S5), the CPU 111 of the PC 1 shuts down the PC 1. On the other hand, in the case where the PC 1 has not been powered off (No at S5), the CPU 111 of the PC 1 continues to control the hardware 110, 116, 117, 118, 213 and 216 of the PC 1, under the control of the third OS (S1).

On the other hand, in the case where the mobile device 2 has been powered off (Yes at S111), the CPU 11 of the mobile device 2 shuts down the PC 1. On the other hand, in the case where the mobile device 2 has not been powered off (No at S111), the CPU 11 of the mobile device 2 continues to control the hardware 3, 5, 6, 10, 16, 17 and 18 of the mobile device 2, under the control of the second OS (S100).

Note that it is always possible to power off the PC 1 and the mobile device 2 in any step.

In Summary

This information processing system processes information through communication between the PC 1 and the mobile device 2. The mobile device 2 mainly has the storage unit 17 (includes the flash memory 19) and the control unit 10 (includes the CPU 11). The storage unit 17 records the first OS and the second OS. The CPU 11 of the control unit 10 selects one of the first OS and the second OS, according to the connection state with the PC 1. The CPU 11 of the control unit 10 controls the mobile device 2 or the PC 1 and the mobile device 2, using the OS (first OS or second OS) selected here.

As described above, with the information processing system of the present embodiment, even if there is a difference in throughput between the PC 1 and the mobile device 2 or the OS differs between the PC 1 and the mobile device 2, information can be effectively processed through cooperation between the PC 1 and the mobile device 2. Specifically, information can be effectively processed, by simultaneously realizing an environment in which the user is able to work efficiently (PC 1 and first OS) and control at a high throughput (control by CPU 11 of mobile device 2).

Other Embodiments (A) In the above embodiment, an example was given in the case where information is processed between the PC 1 and the mobile device 2 through the PC 1 and the mobile device 2 communicating with each other wirelessly. Alternatively, a configuration may be adopted in which information is processed through the PC 1 and the mobile device 2 communicating with each other by cable.

Figure 7:
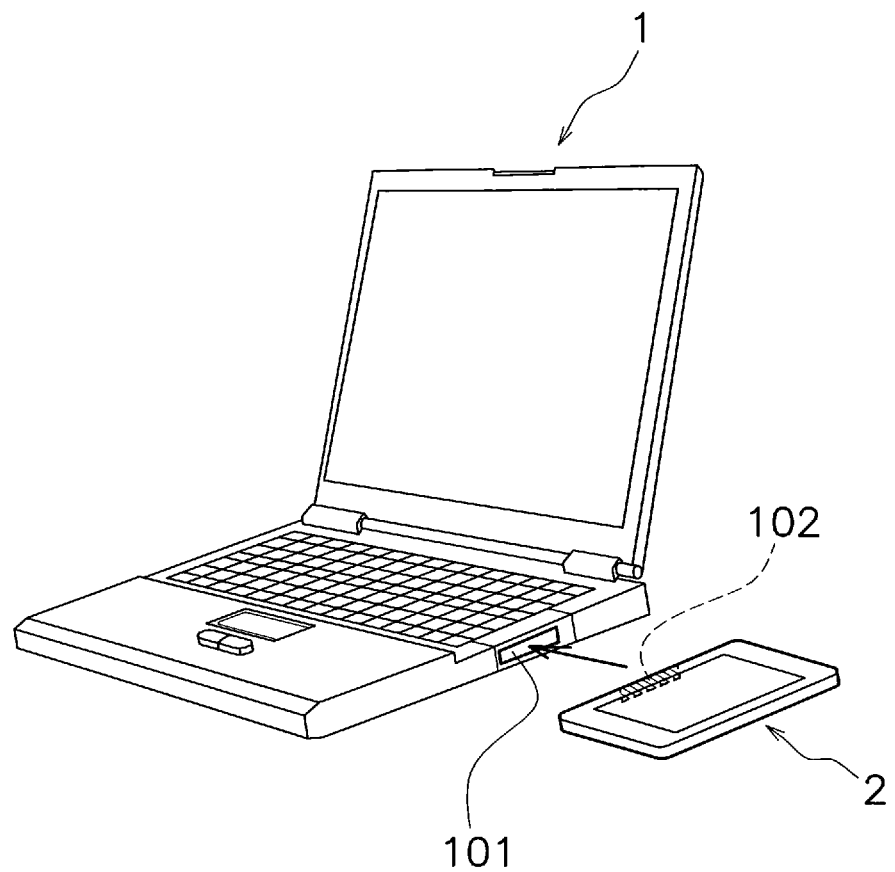
FIG. 7 is a schematic diagram showing a relationship between a mobile device and a personal computer according to another embodiment.

(B) In the above embodiment, an example was given in the case where information is processed between the PC 1 and the mobile device 2 through the PC 1 and the mobile device 2 communicating with each other wirelessly. Alternatively, as shown in FIG. 7, a configuration may be adopted in which information is transmitted between the PC 1 and the mobile device 2, by providing a first connection terminal 101 (first connection unit) in the PC 1, and providing a second connection terminal 102 (second connection unit) in the mobile device 2. In this case, communication is possible between the communication unit 16 of the mobile device 2 and the communication unit 116 of the PC 1 through the first connection terminal 101 and the second connection terminal 102, when second connection terminal 102 of the mobile device 2 is brought into contact with or fitted into the first connection terminal 101 of the PC 1. In this state, the CPU 11 of the mobile device 2 or the CPU 111 of the PC 1 suspends or hibernates the third OS after recognizing the presence of the other device. Then, the CPU 11 of the mobile device 2 runs the first OS in the foreground, instead of the second OS. Information can thereby be transferred between the mobile device 2 and the PC 1.

(C) In the above embodiment, an example was given in the case where, when host software is launched, a screen for this host software is displayed on the monitor unit 213 of the PC 1. In addition, a configuration may be adopted in which, when host software is launched, a screen for this host software is displayed on the monitor unit 3 of the mobile device 2. Also, in this case, the information on the screen for the host software can be edited by instruction means such as the user's finger or a touch pen.

(D) Although an example was given in the above embodiment in the case where the monitor 213a of the PC 1 is mainly used, a configuration may be adopted in which the liquid crystal monitor 3a of the mobile device 2 can be used as an extension monitor of the monitor 213a of the PC 1.

(E) In the above embodiment, an example was given in the case where the first OS operates as the host OS and the second OS operates as the guest OS. Alternatively, the second OS may operate as the host OS and the first OS may operate as the guest OS.

(F) In the above embodiment, an example was given in the case where information processing is executed between the mobile device 2 and the PC 1. Alternatively, a configuration may be adopted in which information processing is executed between the mobile device 2 and a computer that is controlled by a microcomputer or the like, for example. Also, a configuration may be adopted in which information processing is executed between the mobile device 2 and a display device that is controlled by a microcomputer or the like. Furthermore, a PC may be used instead of the mobile device 2.

The present technology can be widely utilized in information processing systems.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the information processing system. Accordingly, these terms, as utilized to describe the technology disclosed herein should be interpreted relative to the information processing system.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An information processing system comprising:
    a first information processing device including a first recording unit and a first control unit, the first recording unit including a third Operating System (OS);
    a second information processing device, the second information processing device including a second recording unit and a second control unit, the second recording unit including a first OS and a second OS; and
    when the first information processing device and the second information processing devices are disconnected from each other, the first control unit is configured to control the first information processing device with the third OS, and the second control unit is configured to control the second information processing device with one of the first OS and the second OS,
    when the first information processing device and the second information processing device are connected to each other, the second control unit is configured to select an OS controlling the first information processing device, the selected OS being one of the first OS and the second OS, the second control unit is configured to control both of the first information processing device and the second information processing device with the selected OS, and the third OS is hibernated or suspended.

2. The information processing system according to claim 1, wherein:
    the second control unit is further configured to recognize a communication state with the first information processing device; and
    the second control unit is further configured to control the second information processing device using one of the first OS and the second OS if the second control unit recognizes that the second information processing device cannot communicate with the first information processing device; and
    the second control unit is further configured to control the first information processing device and the second information processing device using the other of the first OS and the second OS if the second control unit recognizes that the second information processing device can communicate with the first information processing device.

3. The information processing system according to claim 1, wherein:
    the first information processing device includes a display unit, and
    the second control unit is further configured to recognize a communication state with the first information processing device; and
    the second control unit is further configured to issue a display command if the second control unit recognizes that the second information processing device can communicate with the first information processing device; and
    the display unit of the first information processing device is configured to display image information based on the display command.

4. The information processing system according to claim 1, wherein:
    the first information processing device includes a first communication unit;
    the second information processing device further includes a second communication unit configured to communicate with the first communication unit;
    the second control unit is further configured to monitor a communication state between the second communication unit and the first communication unit; and
    the second control unit is further configured to recognize the first information processing device if the second control unit detects that the second communication unit and the first communication unit can communicate.

5. The information processing system according to claim 1, wherein:
    the first information processing device further includes a first connection unit configured to connect to an external device;
    the second information processing device further includes a second connection unit configured to connect to an external device;
    the second control unit is further configured to monitor a connection state between the second connection unit and the first connection unit; and
    the second control unit is further configured to recognize the first information processing device if the first connection unit and the second connection unit are directly connected.

6. The information processing system according to claim 1, wherein:
the second control unit is further configured to recognize a communication state with the first information processing device; and
the second control unit is further configured to recognize the recording unit of the first information processing device using the OS selected according to the connection state with the first information processing device if the second control unit recognizes that the second information processing device can communicate with the first information processing device.

7. The information processing system according to claim 6, wherein:
the recording unit of the second information processing device includes an application program; and
the second control unit is further configured to refer to the recording unit of the first information processing device and recognize data corresponding to the application program if the second control unit recognizes that the second information processing device can communicate with the first information processing device.

8. The information processing system according to claim 1 wherein:
the second control unit is further configured to run one of the first OS and the second OS as a host OS, and run the other of the first OS and the second OS as a guest OS.

9. The information processing system according to claim 1, wherein:
the recording unit of the second information processing device including a first application program; and
the second information processing device is further configured to execute the first application program on the first OS.

10. The information processing system according to claim 9, wherein:
the recording unit of the second information processing device further includes a second application program; and
the second information processing device is further configured to execute the second application program on the second OS.

11. The information processing system according to claim 1, wherein:
the first information processing device further includes a communication unit configured to recognize the presence of the second information processing device.

12. The information processing system according to claim 9, wherein:
the first information processing device further includes a display device configured to display a screen for the first application while the first application is executed by the second information processing device.

13. The information processing system according to claim 10, wherein:
the first information processing device further includes a display device configured to display a screen for the second application while the second application is executed by the second information processing device.

14. The information processing system according to claim 12, wherein:
the second information processing device is further configured to edit information on the screen of the first application.

15. The information processing system according to claim 13, wherein:
the second information processing device is further configured to edit information on the screen of the second application.

16. The information processing system according to claim 1, wherein:
the first information processing device includes a first display device; and
the second information processing device further includes a second display device configured to serve as an extension display device of the first display device.

17. The information processing system according to claim 1, wherein:
at least one of the first information processing device and the second information processing device is a mobile device.

18. The information processing system according to claim 1, wherein:
at least one of the first information processing device and the second information processing device is a personal computer.

19. The information processing system according to claim 1, wherein:
the first information processing device includes a recording unit including data; and
the second information processing device is configured to access and manipulate the data on the recording unit of the first information processing device.

20. The information processing system according to claim 1, wherein:
a processing capability of the second control unit is greater than a processing capability of the first control unit, and
the second control unit controls both of the first information processing device and the second information processing device with the selected OS when the first information processing device and the second information processing device are connected.

* * * * *